United States Patent

[11] 3,602,094

| [72] | Inventor | Roger Bardiau |
| | | 2 rue l'Abbe Dery, 94 Vitry, France |
| [21] | Appl. No. | 781,486 |
| [22] | Filed | Dec. 5, 1968 |
| [45] | Patented | Aug. 31, 1971 |

[54] HORIZONTAL MILLING MACHINE
9 Claims, 5 Drawing Figs.

[52] U.S. Cl. .................................................. 90/15, 90/58
[51] Int. Cl. ............................................. B23d 7/08
[50] Field of Search ..................................... 90/15.1, 15, 11, 58, 58.2, 58.3, 21; 51/240, 240 A

[56] References Cited
UNITED STATES PATENTS

| 2,891,452 | 6/1959 | Zwick et al. | 90/58.2 |
| 3,203,314 | 8/1965 | Ried | 90/58 X |
| 3,371,580 | 3/1968 | Barnes et al. | 90/15 X |

*Primary Examiner*—Gil Weidenfeld
*Attorney*—Stevens, Davis, Miller & Mosher

ABSTRACT: A horizontal milling machine has two machining tables, one of which may be in a horizontal workpiece loading or removing position, while the other may be in a vertical machining position, and means for translating and pivoting the tables between these two positions.

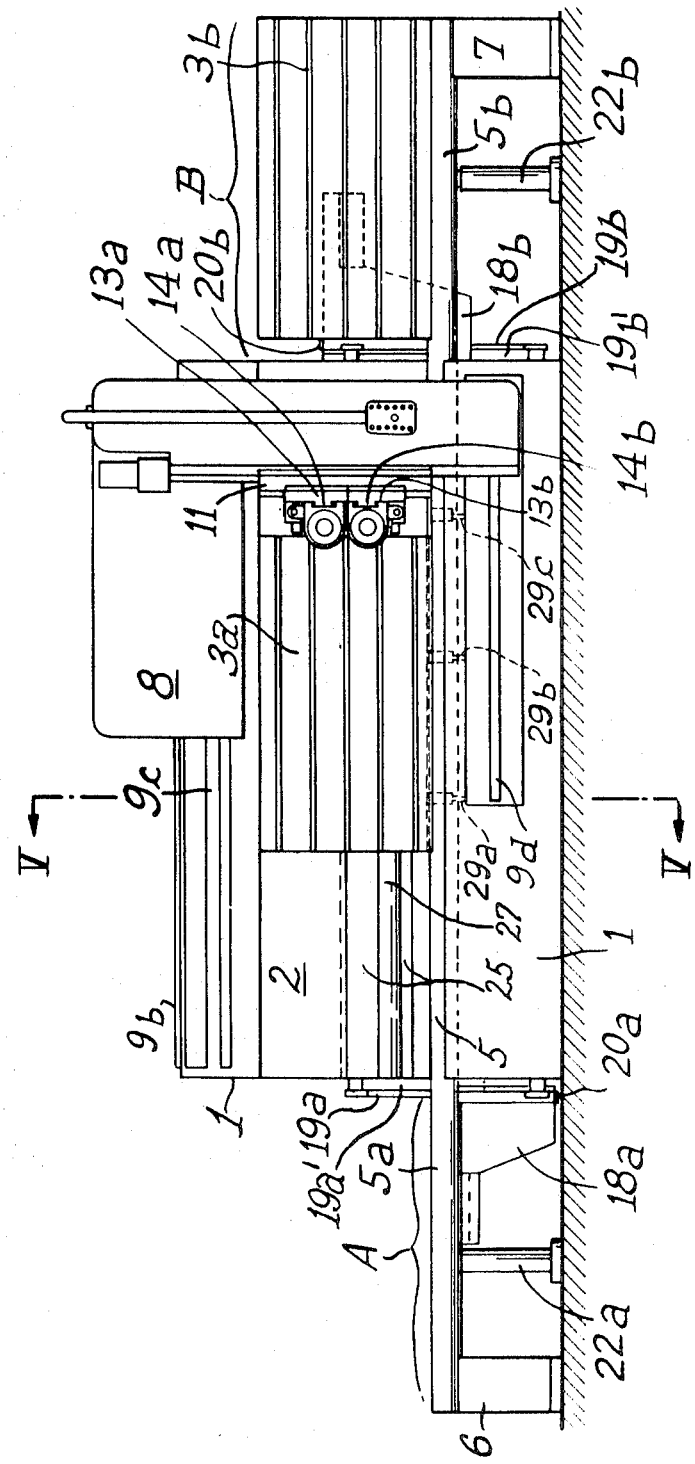

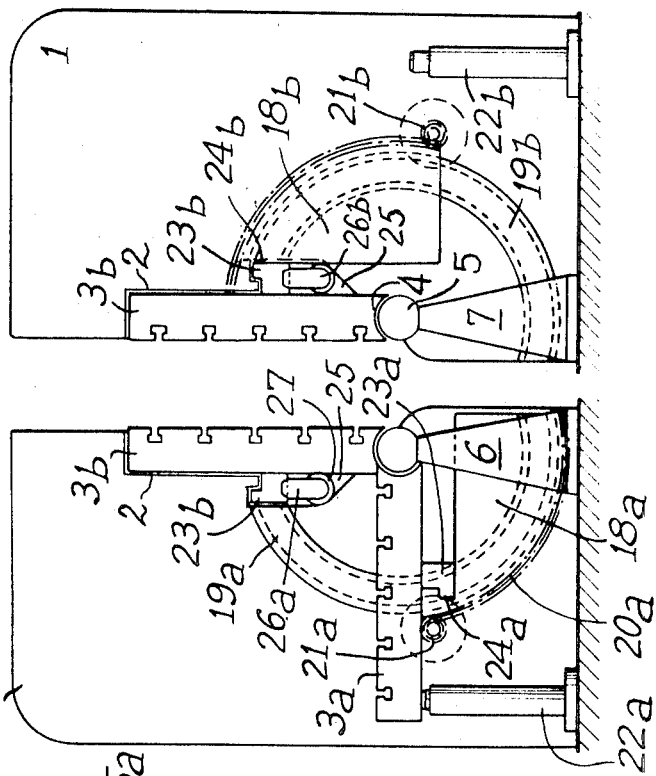
Fig. 4
Fig. 3
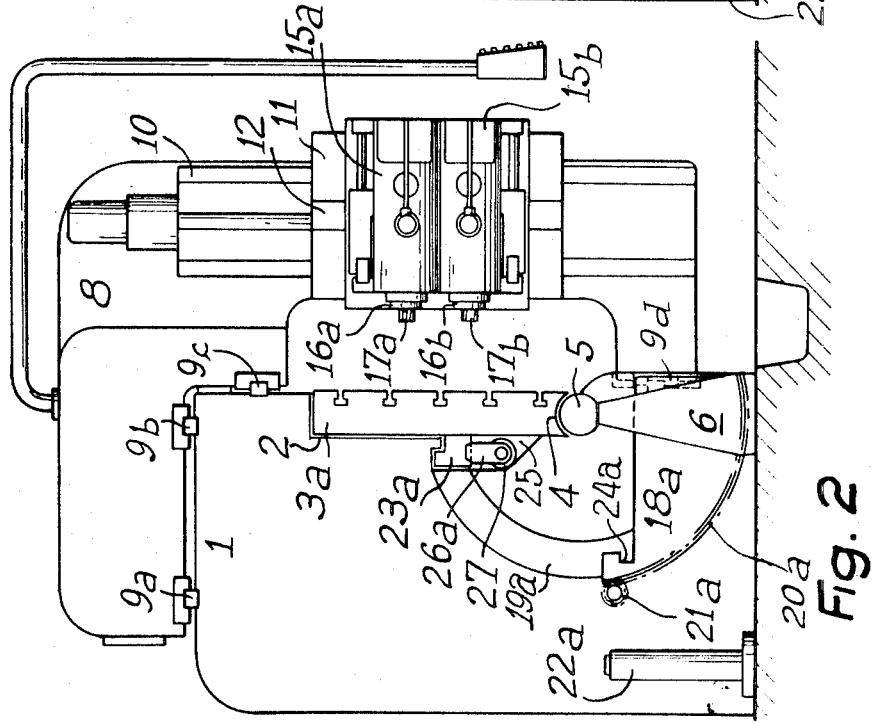
Fig. 2
Inventor
ROGER BARDIAU
By
STEVENS, DAVIS, MILLER & MOSHER
Attorneys

HORIZONTAL MILLING MACHINE

The invention relates to a horizontal milling machine.

The supply of workpieces to be machined to a milling machine with a vertical or inclined table and having a spindle which is perpendicular to the table may be inconvenient insofar as the placing of the workpieces on the table and the removal therefrom is concerned, especially in the case of bulky or heavy components.

There are already known milling machines equipped with a tiltable table adapted to be moved at choice between a horizontal and a vertical position in order to facilitate the loading and the removal of workpieces or to permit the machining of these workpieces at two or more faces without having to remove or dismantle them.

It is also known to use a milling machine with two tables or slides, of which one is in the machining position, whilst the other is in the mounting or removing position.

The present invention seeks to provide a milling machine, comprising means whereby two machining tables can be utilized, of which one is in the position for machining, whilst the other is in the position for mounting or removing the workpieces, wherein the said tables are adapted to be pivoted from the horizontal position for mounting and removing the workpieces into a vertical machining position.

According to the present invention, there is provided a horizontal milling machine including a frame member on which is mounted a horizontally slidable spindle carrier slide, said frame member having a recessed vertical surface adapted to slidingly receive a worktable, a loading or removing station at each longitudinal end of said machine, said frame member supporting a horizontally positioned pivot member extending over substantially the entire length of the machine, two tables on which workpieces may be mounted, each said table being displaceable in a direction parallel to, and pivotable about, said pivot member, whereby each said table may be moved between a substantially horizontal loading or removing position at a said station and a substantially vertical machining position in which it is received by said vertical surface, and drive means to effect the displacement and pivotal movement of the tables.

The invention will be described, merely by way of example, with reference to the accompanying drawings, in which:

FIG. 1 is a front elevation of a milling machine according to the present invention;

FIG. 2 is a side elevation of one end of the milling machine showing one milling table in the operating position;

FIG. 3 is a side elevation of the milling machine showing the table of FIG. 2 in the mounting and dismantling position and the other milling table in the milling position;

FIG. 4 is a side elevation of the opposite end of the milling machine showing the table of FIG. 3 in the transfer position.

Figure 5:
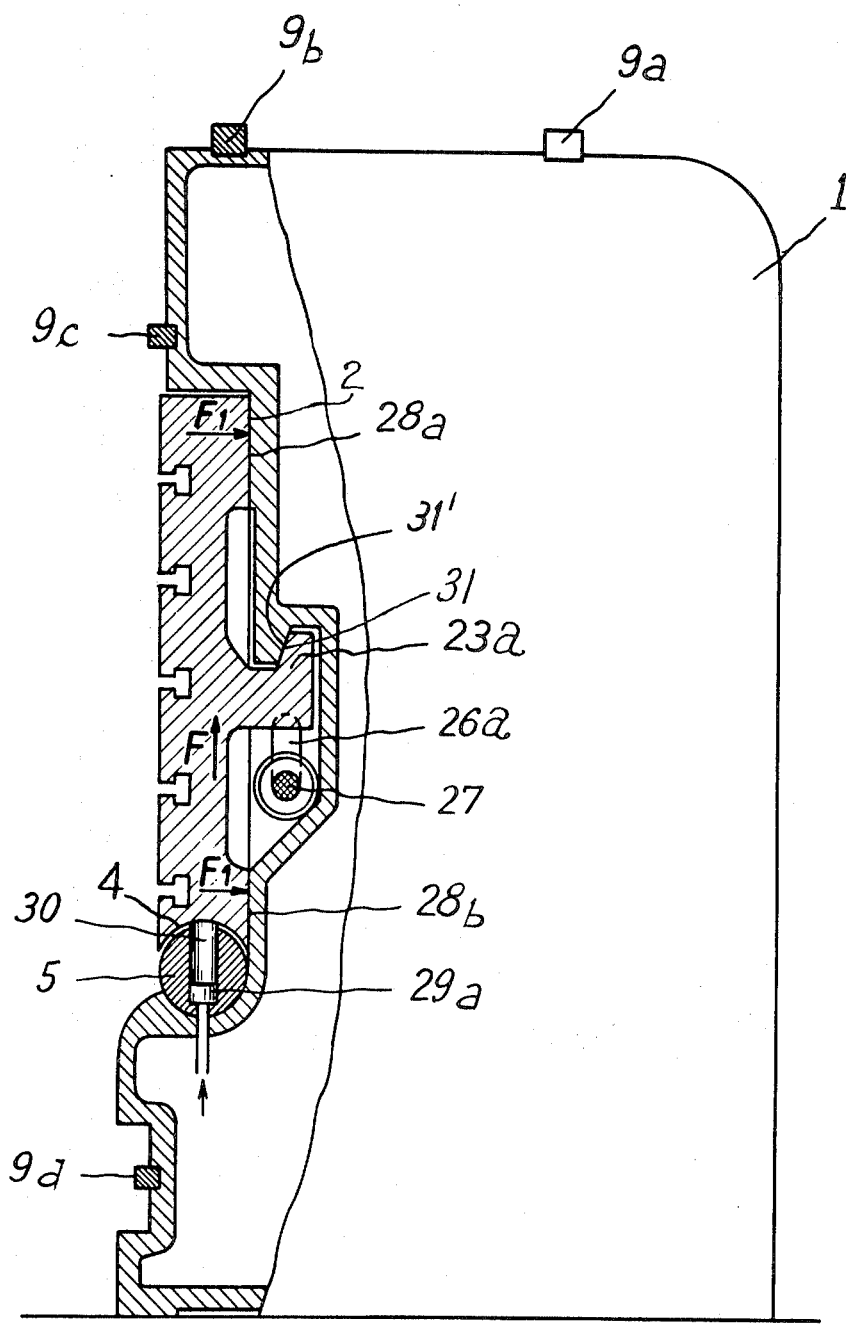
FIG. 5 is a fragmentary cross-sectional view taken along the line V—V in FIG. 1.

Referring to the drawings, FIGS. 1 and 2 show a horizontal milling machine, comprising a frame on which is provided a slide 2 for surface adapted to receive a milling table 3a or 3b on which a workpiece to be machined may be mounted.

The milling table is guided and supported on one of its sidefaces 4 by means of a cylindrical rod 5, fixed horizontally at its two ends on two support members 6 and 7, and supported at its center portion by the frame 1.

The cylindrical rod 5 extends over the entire length of the milling machine and of two operating stations A and B, located symmetrically with respect to the center of the milling machine. The stands serve for mounting workpieces to be machined on the milling table and for removing them therefrom.

The upper part of the frame 1 carries a horizontally slidable slide 8, guided on the frame 1 in guides 9a, 9b, 9c, 9d. The slide 8 includes a vertical guide 10 for guiding a carriage 11, mounted thereon. The carriage 11 has a vertical guide 12, on which is mounted at least one carriage 13a and 13b, each having a horizontal carriage 14a or 14b, adapted to receive respective further carriages 15a, 15b. The carriages 15a, 15b have spindles 16a, 16b on which are mounted the machining tools, e.g., milling bits 17a, 17b, the axes of rotation of which are disposed perpendicularly to the vertical surface of the milling table.

The two operating stations A and B are identical and comprise a rod member 5a or 5b which are the respective end portions of rod 5 on which the table 3a or 3b is guided, as already stated. The tables can be rotated about their associated rods by virtue of their semicircular profile edges 4 in contact with the respective rods. The table 3a or 3b is supported by a bracket 18a or 18b, mounted rotatively about the axis of the rod 5 and guided by a semicircular guide 19a or 19b mounted on each end of frame 1 and engagingly received in a groove 19a' or 19b' formed between said guide and said frame end. The bracket 18a or 18b has at its outer edge a rack 20a or 20b which meshes with a pinion 21a or 21b mounted on said frame and rotatively driven by means not shown.

In operation, rotation of the pinions 21a, 21b, meshing with respective racks 20a, 20b, will drive the brackets 18a, 18b and consequently also the table 3a or 3b, resting on the brackets as will be explained.

Each operating stand A or B also has a supporting member 22a or 22b, resting on the ground and on which the table 3a or 3b is supported when it is in the horizontal position for mounting or removing the workpiece.

The table 3a or 3b has on the side opposite the milling face a longitudinal tongue 23a or 23b which engages in a guide slot 24a or 24b provided in the supporting bracket 18a or 18b when table 3a or 3b is on member 22a or 22b. The vertical surface of frame 1 has horizontal opening 25 for receiving the tongue 23a or 23b when the table is in the transfer position (FIG. 4) at which time the tongues are in contact with drive members 26a or 26b which are integral with a rod 27, mounted slidingly in the frame 1 and actuated by any known means.

The operation of each operation stand is effected in the following manner. With the table 3a, say, in the horizontal position shown in FIG. 3, that is to say, tongue 23a is engaged in the slide 24a, and the table 3a resting on the supporting member 22a the workpiece to be machined may be mounted on the table 3a. Then, by rotating the pinion 21a, the bracket 18a and the table 3a are rotated through 90° about the axis of the rod 5 (via the rack 20a), so as to assume the vertical transfer position, as shown in FIG. 4 for table 3b.

By means of the driving member 26a and the rod 27, the table 3a is made to move horizontally on the milling machine into the working position, shown in FIGS. 1 and 2 the tongue 23a sliding from slot 24a into recess 25.

It will have been noted that according to the present invention, two tables are used, shown respectively at 3a and 3b, corresponding to the two operating stands A and B. As shown in FIGS. 1 and 2, one table 3a, on which the workpieces to be machined may be mounted, is located against surface 2 on the milling machine in the working position with tongue 23a engaged in recess 25, while table 3b, which may be provided with workpiece to be machined or having been machined, is in the transfer position shown in FIG. 4 with tongue 23b engaged in slot 24b of bracket 18b.

When the machining of the workpieces on the table 3a is terminated, it is moved towards the operating stand A in the vertical position the tongue 23a disengaging from recess 25 and engaging slot 24a in bracket 18a, and the table 3b, carrying workpieces to be machined, is transferred, as described above with reference to table 3a towards the milling machine into the operating position.

During the machining of the workpieces on the table 3b, the table 3a is tilted from the transfer position into the horizontal position as shown in FIG. 3, the tongue 23a still engaged in slot 24a, the machined workpieces are taken off, and new workpieces are mounted on the table for machining. Then the table 3a is tilted back into the vertical position for transfer, as illustrated in FIG. 4 for table 3b. When the machining of the workpieces on the table 3b is finished, the two tables move in the reverse direction, in the manner described above.

This combination makes it possible to handle the tables without having to remove them for mounting new workpieces, and to use only two tables instead of an indeterminate number, such as in a transfer.

In an embodiment of the present invention, illustrated in FIG. 5, the displacement of the table 3a or 3b from the transfer position in which it is supported by the rod 5 and bracket 18a or 18b towards a machining position by the action of drive member 26a or 26b in which it rests against support surfaces 28a, 28b, serving as reference stops of the frame, hydraulic jacks are used, such as 29a, 29b, 29c, which are mounted in the rod 5 and the pistons 30 of which are actuated by an hydraulic medium to raise the table vertically in the direction indicated by the arrow F.

The table 3a or 3b has on its tongues 23a or 23b a guide ramp 31, whereby it cooperates with a corresponding ramp 31 provided on the frame 1, as the upper portion of recess 25 on surface 2, so that vertical displacement of the table 3a or 3b in the direction of arrow F causes, by means of these ramps, a lateral displacement of the table in the direction of the arrows $F_1$, during which it makes contact with the surfaces 28a, 28b in a very accurate manner such that this working position for either table is a very accurately located and isostatic working position, which is independent of the transfer position, the latter, of course, not requiring any particular precision in location.

After machining, the supply of pressure fluid to the hydraulic jacks 29a, 29b, 29c, is stopped, the pistons 30 are retracted and the table returns under gravity into contact with the rod 5 for a new transfer.

Although FIG. 5 shows a preferred embodiment of the invention, it is obvious that jacks mounted in the frame could be used for retaining the table in the working position, and it would also be possible to arrange the ramps in any other suitable position of the table and of the frame.

I claim:

1. A horizontal milling machine comprising a horizontal frame member, a vertical face on said frame member having a recessed portion along its length substantially complementary to a worktable to be received therein, a horizontal slide carried on said frame for movement in a horizontal direction, said slide supporting a tool carriage for movement in a vertical direction, a workpiece loading or unloading station at each longitudinal end of said machine, said frame member supporting a horizontally positioned pivot member extending substantially the entire length of the machine and adjacent the lower edge of said recessed portion, two worktables on which workpieces may be mounted, each said table being pivotable about and displaceable while in a vertical plane along said pivot member, separate drive means to effect the displacement and pivotal movement of the tables, means cooperating with said pivot member for retaining each of said worktables in a horizontal or a vertical position, whereby each said table may be securely supported at and moved between a substantially horizontal loading or unloading position at said station and a substantially vertical machining position in which it is received in said recessed portion.

2. A machine as claimed in claim 1 wherein at the juncture of said frame member and each said station there is a supporting bracket mounted to pivot about said pivot member with the respective table, a semicircular guide for each bracket spaced from said frame member, said bracket including a guide slot at its outer end, each table being formed with a projection on its rear surface adapted to be received for sliding engagement in said guide slot when said table is being pivoted and moved to or from said station.

3. A machine as claimed in claim 1 wherein a supporting column is provided for supporting each able at its said station when said table is in its horizontal position.

4. A machine as claimed in claim 2 wherein each said supporting bracket is provided with a toothed rack, there being a pinion which is in mesh with said rack and is adapted to be driven by said pivotal drive means.

5. A machine as claimed in claim 2 wherein said projection on said table slidingly engages a lip in said recessed portion when said table is in said machining position or being moved toward and away from said machining position.

6. A machine as claimed in claim 2 wherein the drive means for the longitudinal displacement of the tables includes a motor and a drive member adapted to alternately engage said projection on each table, said drive member being slidably mounted in said frame member.

7. A machine as claimed in claim 2 wherein the projection on each table and the lip in said recessed portion are provided with cooperating ramp means to guide the movement of said table towards and away from at least one vertical reference surface in said recessed portion of on said frame member.

8. A machine as claimed in claim 7, wherein at least one jack is associated with each table adjacent said vertical reference surface to apply a vertical force on each table causing said ramp means to guide the table towards and away from said vertical reference surface.

9. A machine as claimed in claim 8 wherein said at least one jack is arranged within the said pivot member.